United States Patent
Fadel

(10) Patent No.: US 6,904,463 B1
(45) Date of Patent: Jun. 7, 2005

(54) SYSTEM FOR IMPROVING DELIVERY OF CONTENT BY REORDERING AFTER GROUPING COMPONENTS HOMOGENEOUSLY WITHIN CONTENT STREAM BASED UPON CATEGORIES DEFINED BY CONTENT PREFERENCES

(75) Inventor: Charles K. Fadel, Chelmsford, MA (US)

(73) Assignee: Cisco Technology, Inc., San Jose, CA (US)

( * ) Notice: Subject to any disclaimer, the term of this patent is extended or adjusted under 35 U.S.C. 154(b) by 796 days.

(21) Appl. No.: 09/730,309

(22) Filed: Dec. 5, 2000

(51) Int. Cl.$^7$ .............................................. G06F 15/16

(52) U.S. Cl. ...................................... 709/236; 709/219

(58) Field of Search ................................ 709/236, 219, 709/102, 229, 218, 217; 370/310

(56) References Cited

U.S. PATENT DOCUMENTS

| | | | | |
|---|---|---|---|---|
| 5,706,507 A | | 1/1998 | Schloss ...................... | 395/615 |
| 5,854,856 A | | 12/1998 | Moura et al. ................ | 382/232 |
| 6,119,123 A | * | 9/2000 | Elenbaas et al. ............. | 707/102 |
| 6,317,794 B1 | * | 11/2001 | Papierniak et al. .......... | 709/229 |
| 6,487,180 B1 | * | 11/2002 | Borgstahl et al. ............ | 370/310 |
| 6,668,278 B1 | * | 12/2003 | Yen et al. .................... | 709/218 |

OTHER PUBLICATIONS

"The Science of Speed—Intelligent Network Acceleration," http://www.boostworks.com/us_bstkaa/technology/index.htm, downloaded Aug. 16, 2000 (3 pp.).

"ArrowPoint Web Network Services™—Enabling the Web-Centric Internet," http://www.arrowpoint.com/solutions/white_papers/printer/WebNS.html, downloaded Mar. 14, 2001 (8 pp.).

"Keep Your Web Clean," http://www.webwasher.com/en/products/wwash/index.htm, downloaded Mar. 15, 2001 (3 pp.).

* cited by examiner

Primary Examiner—Le Hien Luu
(74) Attorney, Agent, or Firm—Hamilton, Brook, Smith & Reynolds, P.C.

(57) ABSTRACT

A method, apparatus and article of manufacture for improved delivery of content to a requesting computer connected to a communications network by a communications device by sending, from the requesting computer, a request for content and a plurality of content preferences. A content stream representing the content is then received on a communications device. Components within the content stream are grouped and reordered based upon at least one of the plurality of content preferences. The reordered content stream is then received on the requesting computer. The content stream may contain data formatted using languages such as HTML or XML. Grouping and reordering of the components can be used to compress the content stream and/or filter components from the content stream. Compression and filtering are especially useful in low bandwidth situations, for example analog or wireless modem connections.

19 Claims, 7 Drawing Sheets

102, 110, 120

HTML Content Stream

| Text | .GIF | Text | .JPG | .RAM | .GIF | .PDF | .JPG | .RAM | .GIF |

FIG. 5

Reordered HTML Content Stream

| Text | Text | .PDF | .JPG | .JPG | .GIF | .GIF | .GIF | .RAM | .RAM |

FIG. 6

XML Content Stream

| Ad 1 | Ad 2 | Item | Dim X | Dim Y | Color A | Color B | Price | S&H | Discount |

FIG. 7

Reordered XML Content Stream

| Item | Price | Discount | S&H | Dim X | Dim Y | Color A | Color B | Ad 1 | Ad 2 |

FIG. 8

SYSTEM FOR IMPROVING DELIVERY OF CONTENT BY REORDERING AFTER GROUPING COMPONENTS HOMOGENEOUSLY WITHIN CONTENT STREAM BASED UPON CATEGORIES DEFINED BY CONTENT PREFERENCES

BACKGROUND OF THE INVENTION

This invention relates generally to improved delivery of content in a communications network and more specifically to grouping and reordering content in a content stream based upon user content preferences.

Efficient access to data stored on computers within large networks, for example the World Wide Web ("WWW"), is an increasingly difficult task. Both the number of data pages and the size of data pages is increasing, contributing to the problem of efficient access. Additionally, bandwidth among connected computers affects access and can lead to slow content delivery. This is especially true in low bandwidth situations, such as analog modem connections and wireless connections. One proposed solution to the problem is aimed at improving the routing of the initial data page request, such that a closer, faster, or more suitable data server is located. The ArrowPoint Content Aware Algorithm ("ACA") as implemented in the Cisco Systems' Content Services Switch 11000 series is an example of a content aware switch (see www.cisco.com) that addresses improving the delivery of content before the content request is processed. An alternate approach, acceleration proxies, as implemented in the BoostWeb Optimizer by BoostWorks attempts to accelerate data flow after the request is processed and during content delivery to the requestor (see www.boostworks.com).

Content-based switches (e.g., Cisco 11000 Series Content Service Switches). intelligently prioritize flows based on the content requested, such as streaming audio and video. To achieve this, content-based Web switches use all of the information in the data requests and the HTTP headers (e.g., URL, cookie information) to determine the best server for the data flow. Content-based Web switches can also use the information to apply policies, including security and QoS policies. Content-based Web switches also can use intelligence to deliver "overflow services," dynamically anticipating and replicating "hot" content across Web servers or caches in response to flash crowds. The switches' ability to support "sticky connections" based on cookies enables sophisticated e-commerce and e-transaction oriented services on the Web.

Acceleration proxies attempt to optimize data flow for HTML delivery. The BoostWeb Optimizer is an acceleration proxy that installs in front of a Web server. Based on BoostWorks' Intelligent Network Acceleration ("INA") technology, a BoostWeb Optimizer attempts to reduce the amount of HTTP traffic and speeds delivery of HTML pages and their components. The BoostWeb Optimizer has five layers of operation: analysis, optimization, transaction management, compression and memorization. The Boost-Web Optimizer performs analysis on data, identifies data types (e.g., HTML, JPEG, GIF, XML) and determines the best method to optimize each. Optimization algorithms are adapted to the different components of the Web page. The original format is retained. This pre-processing creates more homogeneous data that makes compression more efficient. BoostWeb Optimizer takes full advantage of the HTTP 1.1 protocol features to manage transactions by keeping a persistent TCP/IP connection open and batching transactions as they are sent to users. The BoostWeb proxy identifies the type and version of users' browsers to apply the highest levels of compression capable for each browser. Proprietary compressor techniques provide intelligent reduction of image size with no visual loss of content. The proxy also memorizes portions of previous work to avoid repetition.

Content-based switches attempt to optimize data requests by intelligently routing HTTP requests before processing, and acceleration proxies attempt to speed delivery of content by reducing the amount of HTTP traffic required after processing, but neither content-based switches nor acceleration proxies solve the problem of efficient data access by grouping and reordering content in a content stream based upon user content preferences.

SUMMARY OF THE INVENTION

The prior art does not address the issue of grouping and reordering content in a content stream based upon user content preferences to improve content delivery. Thus, an effective technique for improved delivery in a communications network is required.

Web content (e.g., HTML, XML) comprises data encoded in various formats (e.g., text, image, audio, video). Web content designers often order the content components according to a logical display order. This results in components not being ordered according to an effective delivery order. The present invention groups and reorders components within a content stream, based upon user content preferences, to optimize content delivery.

The present invention provides a method, apparatus and article of manufacture for improved delivery of content to a requesting computer connected to a communications network by a communications device by sending, from the requesting computer, a request for content and a plurality of content preferences. A content stream representing the content is then received on a communications device. Components within the content stream are grouped and reordered based upon at least one of the plurality of content preferences. The reordered content stream is then received on the requesting computer. The content stream may contain data formatted using languages such as HTML or XML. Grouping and reordering of the components can be used to compress the content stream and/or filter components from the content stream. Compression and filtering are especially useful in low bandwidth situations, for example analog or wireless modem connections.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 5 illustrates an HTML content stream prior to processing by an embodiment of the present invention.

FIG. 6 illustrates an HTML content stream as processed by an embodiment of the present invention.

FIG. 7 illustrates an XML content stream prior to processing by an embodiment of the present invention.

FIG. 8 illustrates an XML content stream as processed by an embodiment of the present invention.

DETAILED DESCRIPTION OF THE INVENTION

A description of preferred embodiments of the invention follows.

Figure 1:
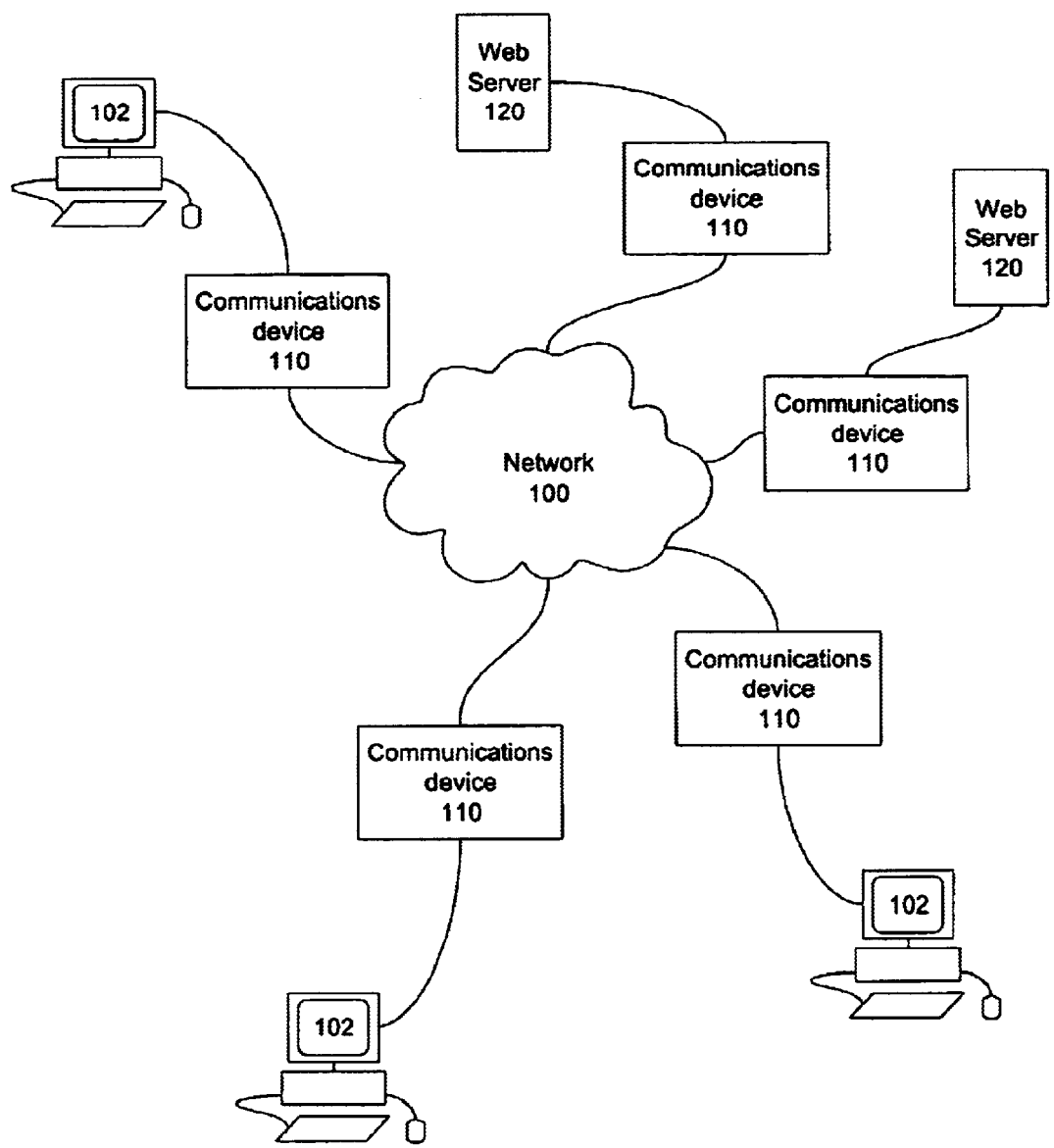
FIG. 1 is an illustration of a communications network upon which an embodiment of the present invention can be implemented.

FIG. 1 is an illustration of a communications network upon which an embodiment of the present invention can be implemented. Computers 102 connect to network 100 using communications devices 110. In one embodiment of the present invention the network 100 is the Internet and computers 102 are personal computers capable of running an Web browser (e.g., Microsoft Internet Explorer or Netscape Navigator). Computers 102 are connected to network 100 using communications devices 110 which may include network routers, switches, cable modems, DSL modems, ISDN modems, analog modems, powerline modems and wireless modems. Also attached to network 100 are Web servers 120, which supply content, based upon requests.

Typically a user of a computer 102 initiates a request for content by specifying an address to a Web browser, the Web browser than packages the address into an HTTP request packet and sends the HTTP request packet into network 100. The HTTP request packet contains the URL address of the content desired, along with any cookies associated with the desired URL address and any content preferences the user might have preselected.

Figure 2:
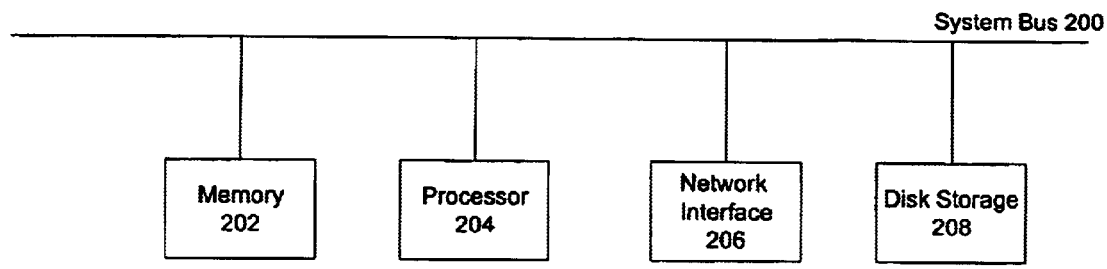
FIG. 2 shows the internal structure of a device within the communications network of FIG. 1.

FIG. 2 shows the internal structure of a device within the communications network of FIG. 1. Communications devices 110 (FIG. 1) contain a system bus 200. The bus 200 is a set of hardware lines used for data transfer among the components of a computer system. The bus 200 is essentially a shared highway that connects different parts of the system (e.g., processor, disk-drive controller, memory, and input/output ports) and enables the different parts to transfer information. Attached to system bus 200 is a memory 202 which stores computer software instructions and data structures used to implement an embodiment of the present invention. A processor 204 executes instructions stored in memory 202, allowing the communications devices 110 to provide improved delivery of content to a requesting computer 102 connected to a communications network 100 by communications devices 110. Network interface 206 provides the link between computers 102 and communications devices 110, as well as from communications devices 110 to network 100. A disk storage device 208 is provided for non-volatile storage on communications devices 110 (e.g., for use in providing improved delivery of content to a requesting computer 102).

Figure 3:
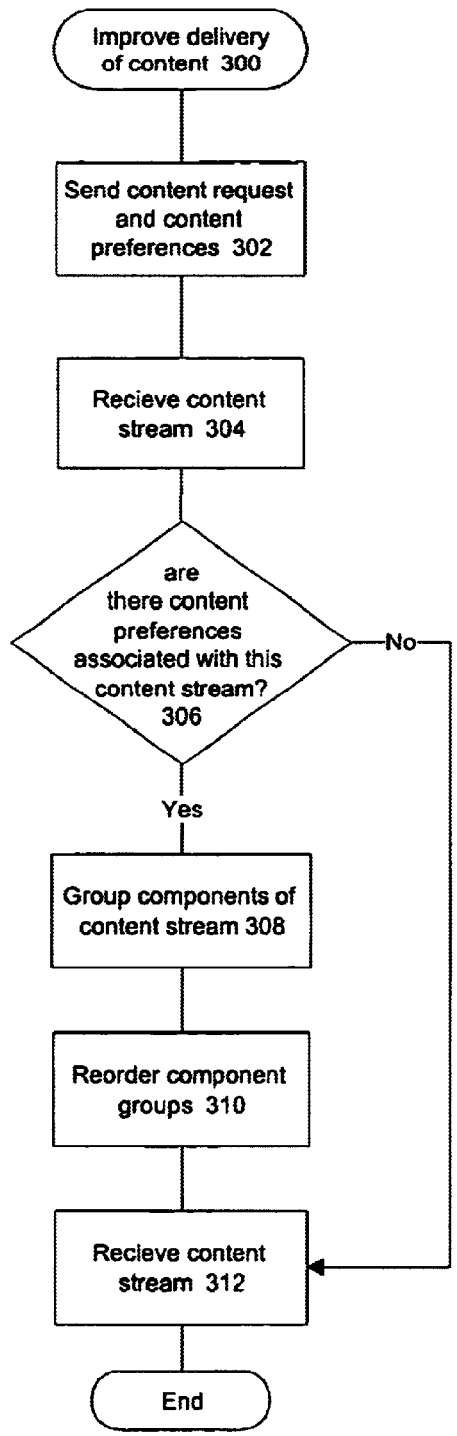
FIG. 3 is a flowchart describing a process for improved delivery of content according to an embodiment of the present invention.

FIG. 3 is a flowchart describing a process for improved delivery of content according to an embodiment of the present invention. A process for improved delivery of content starts at Step 300. A user sends a content request and content preferences into the network 100 (Step 302). The content request and content preferences are supplied using a Web browser. Standard Web browsers provide a mechanism to supply a content request, typically in the form of a URL, for requesting content along with cookies associated with the URL being requested. Additionally, the present invention provides a mechanism for supplying user content preferences as part of the content request. These content preferences allow a user to order the flow of content (e.g., by content type) that is received by the user on the requesting computer. Content preferences also allow a user to filter out unwanted content (e.g., based upon content type). For example, a user of a requesting computer that is not equipped to play audio content (e.g., a requesting computer without speakers) can filter audio content from content requests. In another example, a user of a requesting device with limited processing power, bandwidth or display capabilities (e.g., a wireless communications device) can filter out video and image content.

At step 304 the requested content is received on a communications device as a content stream. On the World Wide Web ("WWW") this stream is typically a HyperText Markup Language ("HTML") or eXtensible Markup Language ("XML") formatted stream. These formatted streams provide opportunities to group components of the stream homogeneously based upon user content preferences. Step 306 checks whether there are content preferences associated with this content stream (as defined in the request for the content). If there are not content preferences associated with this content stream then processing jumps to Step 312, where the content stream is received at the requesting computer. If there are content preferences associated with this content stream then components of the content stream are grouped according to categories defined by the content preferences specified by the user (Step 308). In one embodiment the categories can be content type (e.g., text, image, audio, video, application, or other). As different content types are received by the requesting computer they can be added to a list of known content types that can be displayed to the user when selecting the content preferences. The known content type can be arranged in various ways, including in a hierarchical list.

At Step 310 the grouped components are reordered in the content stream according to the order predefined by the user content preferences. This enables the user requesting the content to specify an ordering preference based upon known capabilities of the requesting computer (e.g., limited processing power may indicated text should be viewed before images) or personal preferences (e.g., users who may want to view images before text). The content stream is received on the requesting computer (Step 312) and the user can now view the content while benefitting from its improved delivery.

Figure 4:
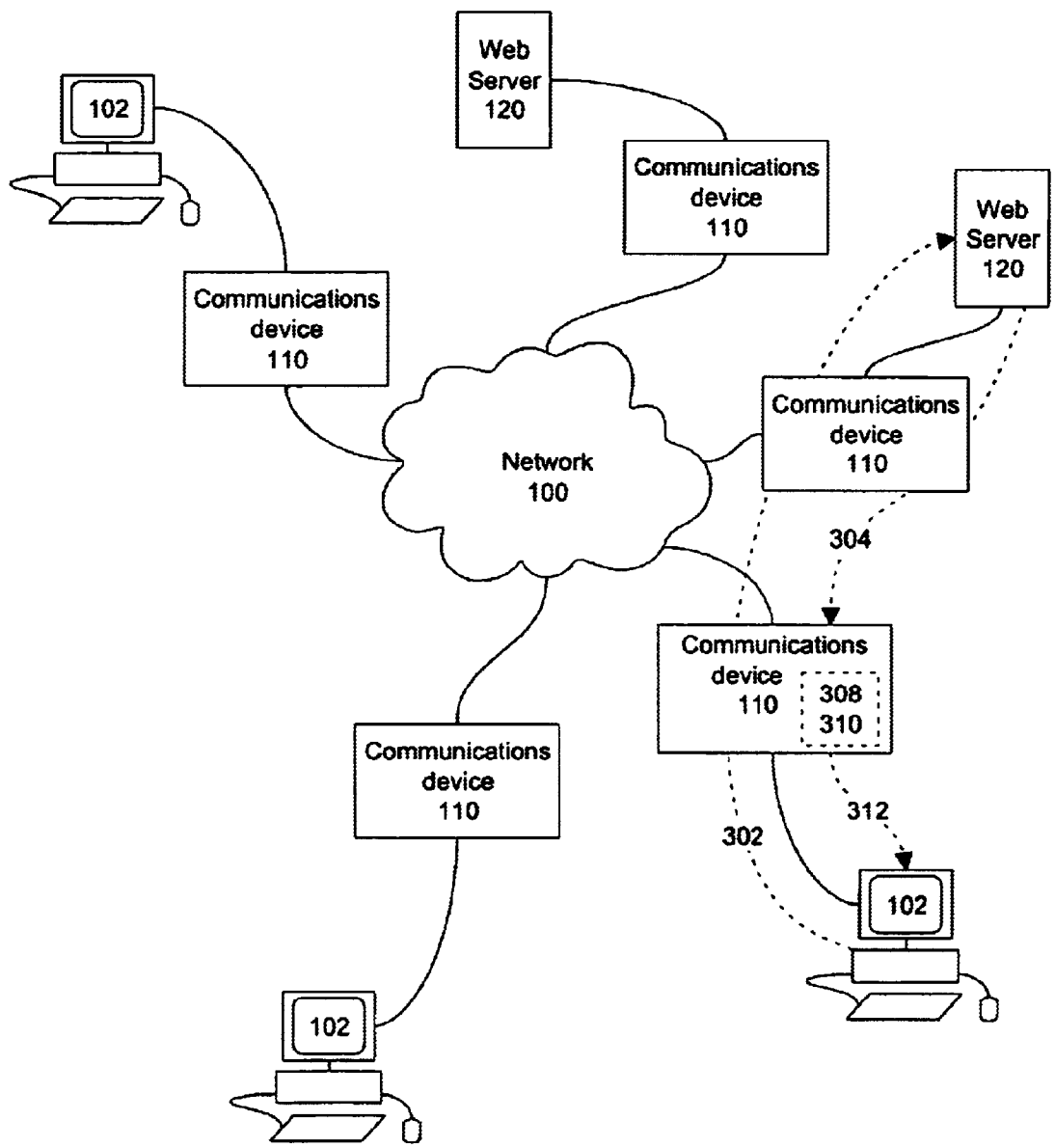
FIG. 4 is an illustration of a communications network upon which an embodiment of the present invention can be implemented showing specific communications steps.

FIG. 4 is an illustration of a communications network upon which an embodiment of the present invention can be implemented showing specific communications steps. In this example a user interacts with requesting computer 104. Requesting computer 104 is connected to network 100 using communications device 116. Requesting computer 104 is executing a Web browser program improved according to an embodiment of the present invention, specifically a mechanism for specifying user content preferences has been added. Communications device 116 executes instructions to perform the steps of grouping and reordering components of the content stream.

Initially a user specifies content preferences using the improved Web browser. In this example the user is specifying content preferences based on content type and has ordered the content type in the following way: first—text, second—image, third—audio, fourth—video and fifth—application. The user specifies a URL to identify the desired content (e.g., "www.example.com/homepage.html"). The browser creates a HTTP request packet specifying the URL, any associated cookies and the content preferences. The Web browser sends the HTTP request packet (302) through various communications devices 114–116 attached to network 100. The HTTP request packet is eventually received and processed by Web Server 120. Web Server 120 processes the HTTP request using standard protocols, builds a content stream and sends the content stream through communications device 114 into network 100. Communications device 116 receives the content stream (304), representing "homepage.html", containing text, image and audio content. The grouping step (308) parses the content stream, identifying various components within the stream. The components are grouped in such a way as to satisfy the predefined content preferences. The grouped components are then reordered (310) into a reordered content stream, based upon the predefined content preferences, and sent to requesting computer 104 where they are received (312) and can be displayed.

FIG. 5 illustrates an HTML content stream prior to processing by an embodiment of the present invention. The content stream contains text, image and audio content types. Specifically, the content stream contains ANSI text representations for text, Adobe Portable Document Format ("PDF") for formatted text, Graphics Interchange Format ("GIF") and Joint Photographic Experts Group ("JPG") representations for images, and Real Audio media ("RAM") representations for audio. In a content stream unprocessed by the present invention the various content types are not arranged based upon content preferences. An unprocessed content stream is not ordered according to the requestor's preferences nor homogeneously grouped to take full advantage of available compression algorithms.

FIG. 6 illustrates an HTML content stream as processed by an embodiment of the present invention. This content stream represents the same text, image and audio content as described in FIG. 5 and has been processed by the present invention. Grouping has been performed based upon content preferences (in this case based on content type) and reordering has also been performed (in this case text preceding formatted text preceding image and image preceding audio). This content stream can be delivered according to the requestor's preferred ordering and can take full advantage of existing compression algorithms to reduce the bandwidth required to deliver the content stream to the requesting computer.

FIG. 7 illustrates an XML content stream prior to processing by an embodiment of the present invention. The content stream contains XML tagged data items including two banner advertisements (Ad1, Ad2), a data item describing a product (Item), some X-axis and Y-axis product dimension information (Dim X, Dim Y), some product color information (Color A, Color B), the product price (Price), shipping and handling costs (S&H) and a price discount (Discount). In a content stream unprocessed by the present invention the various content types are not arranged based upon content preferences. An unprocessed content stream is not ordered according to the requestor's preferences nor homogeneously grouped to take full advantage of available compression algorithms.

FIG. 8 illustrates an XML content stream as processed by an embodiment of the present invention. This content stream represents the same advertisements, product data and product pricing as described in FIG. 7 and has been processed by the present invention. Grouping has been performed based upon content preferences (in this case based on content type) and reordering has also been performed (in this case product description (Item) preceding product price (Price) preceding price discount (Discount) preceding shipping and handling costs (S&H) preceding product dimension information (Dim X, Dim Y) preceding product color information (Color A, Color B) and color information (Color A, Color B) preceding advertisements (Ad1, Ad2)). This content stream can be delivered according to the requestor's preferred ordering and can take full advantage of existing compression algorithms to reduce the bandwidth required to deliver the content stream to the requesting computer. For example, unwanted advertisements (Ad1, Ad2) can be placed at the very end of the content stream where they will be displayed last, or not at all if another content stream is display prior to the advertisements getting a chance to fully display.

Figure 9:
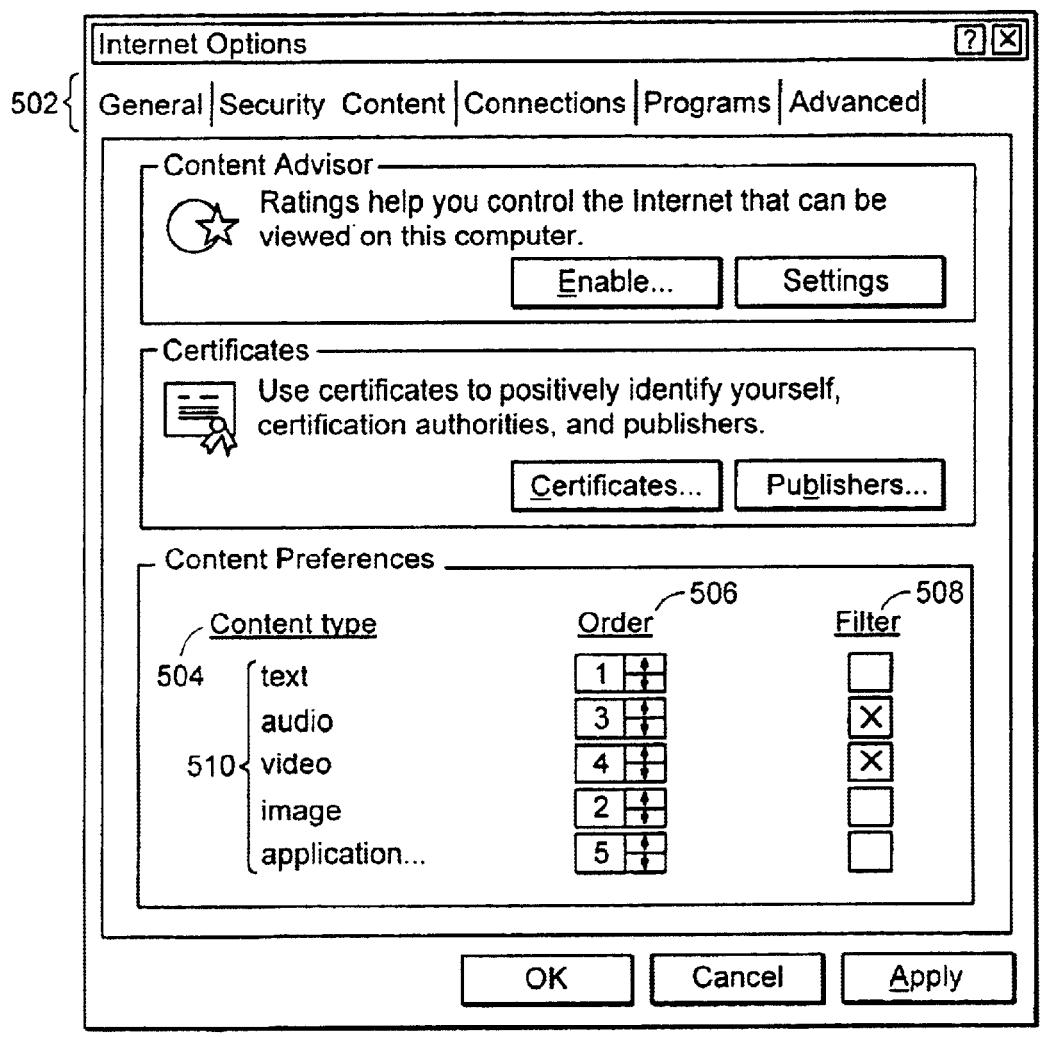
FIG. 9 illustrates a graphic user interface for specifying content preferences according to an embodiment of the present invention.

FIG. 9 illustrates a graphic user interface for specifying content preferences according to an embodiment of the present invention. Web browsers provide mechanisms for setting Web/Internet options. In one embodiment of the present invention Microsoft Internet Explorer provides an "Internet Options" dialog box 500 organized using tabs 502 (e.g., "General", "Security", "Content", "Connections", "Programs" and "Advanced"). The "Content" tab contains various option setting mechanisms for Advisor Ratings and Certificates, as well as for Content Preferences. In one embodiment the content preferences comprise content type 504, order 506 and filter 508 options.

The content type 504 entry contains a list of content types 510 upon which the user of the requesting computer has determined it is important to perform ordering, filtering, or both. The list of content type 510 can be primed from a list of well defined content types (e.g., Multipurpose Internet Mail Extensions ("MIME") types, HTML tags or XML tags). Content types can also be dynamically added as different content streams are received. The requesting computer can add new content types to a list of known content types. The known content type can be arranged in various ways, including in a hierarchical list. Content types of interest can be indicated using various well know techniques, including check marks, highlighting or movement of entries to a separate list. Content types are shown here as a specific example of a content preference. Other content preferences can be specified, as well as combined, to impose a content requestor's preferences on the order in which the requested content stream is received. For example, the requester may specify a content preference based upon content stream component size, such that smaller components, regardless of content type, are to be received before larger components.

The order 506 entry allows a requestor to specify the sequence in which to receive components of the requested content stream. Various well known user interface mechanisms allow specific selection of the order 506 entry. For example, an edit box with increment/decrement arrows can be used to specify order 506. Several content types can be specified as having the same order 506. This results in a guarantee that any content type 504 specified as having a higher order will be sent after all components having a lower order have been sent. There is no guarantee of order among content types 504 having the same order 506.

While this invention has been particularly shown and described with references to preferred embodiments thereof, it will be understood by those skilled in the art that various changes in form and details may be made therein without departing from the scope of the invention encompassed by the appended claims.

In one embodiment of the present invention the steps of grouping and reordering of the content are run on the communications device closest to the requesting computer. Those skilled in the art will recognize that in other embodiments the steps of grouping and reordering of the content are run on different communications devices, including a communications device closest to the content host server.

Content preferences are not limited to content types, those skilled in the art will recognize that other groupings, for example based on content stream component size, can also be implemented in embodiments of the present invention.

Content preferences are not limited by their transport mechanism, in one embodiment content preferences are stored on a communications device as the request travels through the communications device on its way to a content host server (e.g., Web Server 120). In another embodiment the content preferences are stored in the HTTP request header and travel with the HTTP message throughout the communications network.

What is claimed is:

1. A method for improved delivery of content by a communications device to a requesting computer connected to a communications network comprising the steps of:
   receiving, from the requesting computer, a request for content and a plurality of content preferences;
   receiving a content stream representing the content;
   grouping components homogeneously within the content stream based upon categories defined by at least one of the plurality of content preferences;
   reordering the component groups within the content stream based upon at least one of the plurality of content preferences; and
   sending, to the requesting computer, the reordered content stream representing the requested content.

2. The method of claim 1 wherein at least one of the component groups is compressed.

3. The method of claim 1 wherein the content stream is an HTML content stream.

4. The method of claim 1 wherein the content stream is an XML content stream.

5. The method of claim 1 further comprises the step of filtering out content from the content stream based upon at least one of the plurality of content preferences.

6. The method of claim 1 wherein the communications device is connected to the communications network using a DSL, analog, cable, wireless or power line modem.

7. The method of claim 1 wherein the categories include content type.

8. The method of claim 1 wherein the categories include content stream component size.

9. An apparatus for improved delivery of content by a communications device to a requesting computer connected to a communications network comprising:
   a communications device receiving a request for content and a plurality of content preferences from a requesting computer and a content stream representing the content;
   a first logic unit executing on the communications device grouping components homogeneously within the content stream based upon categories defined by at least one of the plurality of content preferences;
   a second logic unit executing on the communications device reordering the component groups within the content stream based upon at least one of the plurality of content preferences; and
   a transmission unit executing on the communications device sending the reordered content stream to the requesting computer.

10. The apparatus of claim 9 wherein at least one of the component groups is compressed.

11. The apparatus of claim 9 wherein the content stream is an HTML content stream.

12. The apparatus of claim 9 wherein the content stream is an XML content stream.

13. The apparatus of claim 9 further comprising a filter filtering out content from the content stream based upon at least one of the plurality of content preferences.

14. The apparatus of claim 9 wherein the communications device is connected to the communications network using a DSL, analog, cable, wireless or power line modem.

15. The apparatus of claim 9 wherein the categories include content type.

16. The apparatus of claim 9 wherein the categories include content stream component size.

17. An apparatus for improved delivery of content by a communications device to a requesting computer connected to a communications network comprising:
   a means for receiving, from the requesting computer, a request for content and a plurality of content preferences;
   a means for receiving a content stream representing the content;
   a means for grouping components homogeneously within the content stream based upon categories defined by at least one of the plurality of content preferences;
   a means for reordering the component groups within the content stream based upon at least one of the plurality of content preferences; and
   a means for sending, to the requesting computer, the reordered content stream.

18. A computer program product comprising:
   a computer usable medium for providing improved delivery of content by a communications device to a requesting computer connected to a communications network; and
   a set of computer program instructions embodied on the computer usable medium, including instructions to:
   receive, from the requesting computer, a request for content and a plurality of content preferences;
   receive a content stream representing the content;
   group components homogeneously within the content stream based upon categories defined by at least one of the plurality of content preferences;
   reorder the component groups within the content stream based upon at least one of the plurality of content preferences; and
   send, to the requesting computer, the reordered content stream.

19. A computer data signal embodied in a carrier wave comprising a code segment for providing improved delivery of content by a communications device to a requesting computer connected to a communications network; and
   a set of computer program instructions embodied on the computer data signal, including instructions to:
   receive, from the requesting computer, a request for content and a plurality of content preferences;
   receive a content stream representing the content;
   group components homogeneously within the content stream based upon categories defined by at least one of the plurality of content preferences;
   reorder the component groups within the content stream based upon at least one of the plurality of content preferences; and
   send, to the requesting computer, the reordered content stream.

* * * * *